Nov. 28, 1961 C. HAINES, JR., ET AL 3,010,599

THERMALLY INSULATED TANK STRUCTURE

Filed July 22, 1958

INVENTORS
CHARLES HAINES, JR.
WILLIAM G. OWENS

ATTORNEY

United States Patent Office
3,010,599
Patented Nov. 28, 1961

3,010,599
THERMALLY INSULATED TANK STRUCTURE
Charles Haines, Jr., Manheim Township, Lancaster County, and William G. Owens, Lititz, Pa., assignors to Armstrong Cork Company, Lancaster, Pa., a corporation of Pennsylvania
Filed July 22, 1958, Ser. No. 750,125
9 Claims. (Cl. 220—9)

This invention relates to a thermally insulated tank structure or the like.

Insulated tanks are commonly used in the petroleum, chemical and other industries. The tanks frequently are insulated to maintain the temperature of the fluid in the tank above normal temperature and in other instances, such as liquefied butane storage, the tanks are insulated to maintain the fluid, generally a gas, below normal temperatures. In many cases, the tank is not housed within a building, and thus the insulated structure must be protected against the elements.

Tanks generally, and large tanks particularly, are difficult to insulate properly, and much hand labor normally is required, resulting in high labor costs for application and finishing of the insulation.

An object of the present invention is to provide a system for insulating tanks which may be installed with a minimum of labor.

Where tanks are installed to maintain temperature below normal, it is desirable, and where temperatures below freezing are to be maintained, it is important if not essential with insulation materials which are not water and water vapor impervious, to seal the insulated structure against the penetration of water or water vapor into the insulation.

Another object of the invention is to provide an insulated tank structure in which the insulation may be protected against water and water vapor penetration.

Frequently tanks used in chemical processing and other industries contain materials which are heated or cooled periodically during processing. This results in expansion and contraction of the tank during such cycles. This may result in substantial dimensional changes in a large tank. The insulation normally secured to the tank does not have the same coefficient of expansion as the tank, and buckling, cracking, and undue compression of the insulation frequently results. Attempts have been made to overcome this problem by the use of expansion joints and other expedients which have increased the cost of insulating the tanks.

Another object of the invention is to provide an insulated tank structure in which the insulation is in effect a free-standing sheath enclosing the walls of the tank and within which sheath the tank may freely contract without affecting the insulation.

Figure 1:
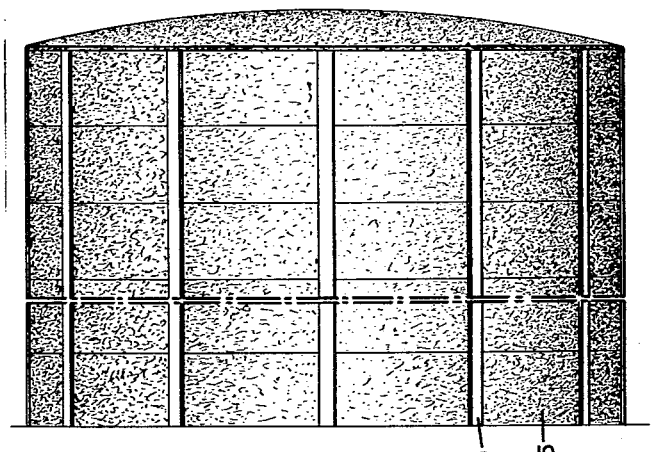
Figure 2:
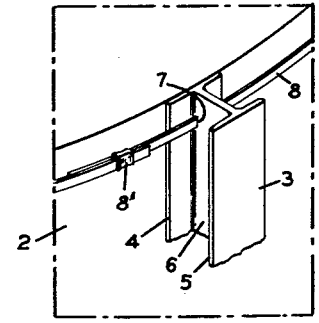
Figure 3:
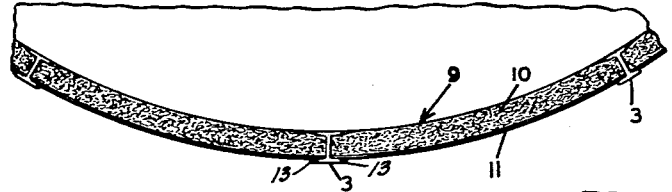
Figure 4:
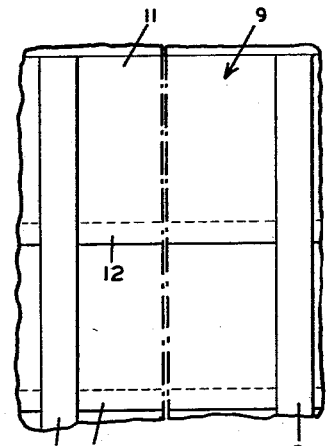
Figure 6:
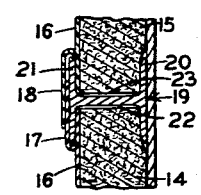
Figure 5:
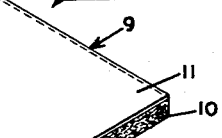

Other objects of the invention will be clear from the following description of an embodiment of the invention. The accompanying drawing which illustrates the embodiment includes:

FIGURE 1, a diagrammatic view of an insulated storage tank;

FIGURE 2, a detailed perspective view to a larger scale than FIGURE 1, showing the mounting of an insulation support on a tank;

FIGURE 3, a top plan view, also to a larger scale than FIGURE 1, showing a portion of the tank of FIGURE 1 during the course of installation of the insulation, before the top insulation is applied;

FIGURE 4 is a front view, broken away and also to a somewhat larger scale than FIGURE 1, showing a portion of an insulated tank;

FIGURE 5, a perspective view to an enlarged scale over FIGURE 1, showing a piece of insulation with a vapor barrier sheet laminated thereto; and FIGURE 6, a sectional view illustrating a modification of the invention.

The tank shown in FIGURE 1 may be assumed to be about 25' in diameter and about 50' high with a domed top. The invention, of course, is not limited to any size of tank or any particular tank construction.

The vertical wall 2 of the tank, as shown in FIGURE 2, has mounted thereon nonconducting supports 3, one of which is shown in FIGURE 2; and a number of them are shown in FIGURE 3. The supports preferably are formed of molded fiber glass reinforced polyester resin, but they may be made of extruded filled thermoplastic synthetic resins, such as polyethylene, polystyrene, polyvinyl chloride, or other non-metallic material which is a poor thermal conductor, i.e. essentially nonconducting. Also, they may be molded of thermosetting resin compositions, such as phenolic resin composition.

Preferably, the supports 3 are mounted parallel to the axis of the tank, vertically as shown in the drawing. They are of I shape in section, as shown in FIGURES 2 and 3, and include an inner flange 4 and an outer flange 5, which may be about 2" wide and about 0.035" thick, and a connecting web 6 about 2" deep and about 0.055" thick, when a molded fiber glass reinforced polyester resin supporting member is used. The size of the supporting members 3 will vary, of course, with the size of the insulation panels to be installed. Generally, the insulating panels will not exceed 2" in thickness. The web 6 is provided with spaced slots 7 disposed adjacent to the flange 4 which are dimensioned to pass a metal band 8 therethrough. The metal band may be made of galvanized iron about 1" wide and of .020" gauge. In a typical installation, such slots 7 will be provided in the web 6, spaced on 12" centers.

The supports 3 are spaced circumferentially around the tank on centers which will permit insulating panels 9 to be fitted in between the webs 6 of adjacent pairs of supports 3, as shown in FIGURE 3. For example, with insulation panels 72" long x 24" wide x 2" thick, the supports 3 will be spaced circumferentially about 72" apart to receive the insulation panels on edge therebetween. In the event the circumference of the tank is not a multiple of the length of the insulation panels 9, there may be one section which will require insulation panels of shorter length which may be cut and fitted on the job.

The supports 3 are held in proper position on the tank wall 2 by drawing up the bands 8 and clamping the overlapped ends in fixed position by metal clamping members 8', as shown in FIGURE 2. A metal band tensioning and clamping device, such as used in the packaging industry, may be provided for this purpose. These bands when drawn up tightly hold the supports 3 in good close engagement with the vertical wall 2 of the tank.

Where the insulation panel 9 is 2" thick, as in the above example, the depth of the web 6 measured from inside of the flanges 4 and 5 may be about 2", as mentioned above.

The insulation panel 9 shown in FIGURE 5 includes a body 10 of polystyrene resin beads expanded and joined together into a substantially rigid body which is capable of limited flexure. The outer surface of the body 10 is covered with a rigid protective layer 11 which may be a sheet of unplasticized vinyl resin about 0.030" thick. The facing layer 11 preferably is adhered throughout to the face of the body 10 of insulation. An extending flap or flange 12 is provided which projects beyond the edge of the body 10 of insulation. If the insulation body is of such character that water vapor transmission to the body is a problem, the facing layer 11 may serve as a water vapor barrier. It also serves as a protective and decorative covering.

Assuming that the supports 3 have been positioned and properly banded into place, workmen insert the insulation panels 9 in position between the adjacent pairs of supports 3, with the flanges 12 in a depending position as shown in FIGURE 4. The panels may be inserted by placing one 24″ transverse edge of a panel into position within the opening defined by the flanges 4 and 5 of one of the insulation supports 3 and then flexing the panel along its 72″ length in an outwardly direction until the 24″ transverse edge opposite to the edge which has been inserted has cleared the outer flange 5 of the next adjacent insulation support 3. The panel is then permitted to "snap" into position below the flange 5 and within the opening defined by flanges 4 and 5. The natural resiliency of the insulation material from which the panel is made will cause the panel to tend to assume a flat condition and the edges lying below the flanges 5 of the supports 3 will be yieldingly or resiliently urged into engagement with the flanges and webs of adjacent supports. The natural resiliency of the facing layer 11 may aid in imparting the desired "snap action." Where the panel includes a protective facing 11, as in FIGURE 5, the flanges 12 are carefully lapped over the previously applied panel, as shown in FIGURE 4. If the facing layer 11 is to serve as a vapor barrier, it may be desirable to have the flanges 12 adhesively sealed in position to form a vaporproof joint.

When the topmost panel has been installed, any portion which may project above the top of the tank is trimmed off. When all of the panels have been installed against the side wall, the top of the tank is covered with insulation in the conventional manner, usually by adhesively bonding insulation panels directly to the top wall of the tank. The top of the tank is then finished by application of a vaporproofing and weatherproofing covering, if necessary. Generally, a plastic coating is applied; or where the tank is for outside service, a membrane reinforced asphalt mastic may be used, for example. A metal or other flashing may be provided at the joint where the top and side walls meet.

FIGURE 1 shows a completed tank without any finishing or protecting layers or coverings. While it is preferred to apply the facing to the insulation panels prior to installation, it is obvious that the facing may be applied subsequent to installation of the insulation panels. A plastic protective and/or decorative coating may be desired, for example, and this would preferably be applied as a finishing step after the insulation has been positioned. For some services, as in the interior of a chemical processing plant, no such finishing or protecting coverings may be needed, but generally a covering is used. In some instances, sheets of metal, fiber glass reinforced polyester resin, or other facing materials may be snapped into place over the insulation panels and below the outer flanges of the insulation supports or may be inserted at the top of the tank and slid downwardly into place. Suitable overlapping of the joints may be effected.

To insure against moisture or moisture vapor penetration into the insulation along the edges of the insulation supports 3, a bead of plastic caulking composition 13, as shown in FIGURE 3, may be run along the edges of the supports at the joints where the insulation panels engage the underside of the outer flanges 5 of the supports 3. This is preferably accomplished as a final step, after any protective facing has been applied or is installed with the insulation in the case of a prefabricated insulation panel and facing layer, as shown in FIGURE 5.

It is preferred to have the relationship between the depth of the web 6 of the insulation supports 3 and the thickness of the insulation such that when the insulation panels are inserted, the edges of the panels which engage under the outer flanges 5 of the insulation supports 3 will be under compression. Actually with materials such as the molded polystyrene bead insulation, corkboard insulation or the like, the insulation may be of such thickness relative to the depth of the web that it will be necessary to compress the insulation into the opening between the flanges 4 and 5. This will insure the maintenance of a good tight joint between the edges of the insulation and the insulation supports. Also, it is desirable to have insulation supports so spaced that when the insulation panels are snapped in place, the edges of the insulation which face the opposed webs of adjacent insulation supports will firmly engage those webs.

The invention has been shown as in FIGURES 1–4 embodied in a vertically disposed tank. It is obvious that it will be equally applicable to a vertically disposed tank, or one disposed at an angle. The supports 3 will be positioned generally parallel to the axis of the tank.

FIGURE 6 illustrates a modification of the invention as applied to a horizontal tank. In this embodiment, the insulation panels 14 and 15 are each provided with preformed facings 16 which are adhered to the insulation. The facings 16 have preformed shields 17 and 18 in the form of flanges molded or otherwise formed on the opposite edges. One edge of each is shown; the shield 17 being shown on the lower panel 14, and the shield 18 being shown on the upper panel 15 in FIGURE 6. The shields 17 and 18 are shaped to be received over the insulation support 19 which has an inner flange 20, an outer flange 21, and a connecting web 22. The facing and the support both may be formed of molded fiber glass reinforced polyester resin.

In the installation of this type of panel, the workman inserts the edge 23 of the panel into position between flanges 20 and 21 and into engagement with web 22 of the insulation support 19. This brings the shield 18 over the flange 21 and also over the shield 17 of the previously installed panel shown in FIGURE 6. He then flexes the panel 15 to a sufficient extent to permit the opposite edge of the panel to clear the next upper insulation support (not shown) and then snaps the panel in place below the flange which corresponds to the flange 21 shown in FIGURE 6. This brings the shield 17 of the panel 15, which shield is not shown in FIGURE 6, into a position the same as the shield 17 of panel 14 which is shown in FIGURE 6. This provides a structure in which the shield 18 which overlaps the shield 17 serves as a rain deflector, preventing the entrance of water into the joints between adjacent horizontally disposed insulation supports and the insulating panels received therebetween.

The type of insulation material used is not critical; but, as mentioned above, it is preferred to use a so-called rigid but resilient insulation, as contrasted with glass fiber batts or hair-felt mats, for example, to attain the advantages which result from the "snap-in" installation and the resilient springing of the insulation against the insulation supports to maintain tight joints. However, where the facings are made of rigid but flexible materials, such as metal, unplasticized vinyl resin, fiber glass reinforced polyester resin sheets, or the like which are adhered to the insulation, soft batt-type insulation materials or properly fitted and shaped segments of rigid inflexible insulation, such as foamed glass, may be used and the resiliency of the facings relied upon to provide the desired snap action and to yieldingly urge the attached insulation into proper position with respect to the insulation supports.

While in most instances the frictional engagement between the insulation panels and the insulation supports and the tank wall or the compressive strength of the insulation material will be adequate to prevent overloading of the lowermost panels by the panels superimposed thereabove, mechanical fastenings may be provided such as sheet metal screws which may be passed through the outer flanges of the supports and received within the facings adhered to the insulation.

We claim:
1. A thermally insulated, generally cylindrical structure comprising a plurality of spaced nonconducting sup- ports of I shape in cross section, connecting bands received through openings in said supports closely adjacent to the base flanges thereof, encircling said structure and securing said supports to the surface to be insulated, and rectangular-preformed panels of semirigid, resilient thermal insulation material of substantially uniform thickness throughout positioned on edge in radially sprung condition between each adjacent pair of said supports and confined against radial displacement by the flanges of said supports.

2. A thermally insulated structure in accordance with claim 1 in which said panels of thermal insulation material are comprised of a body of thermal insulation material and a hard resilient facing sheet joined to said insulation material.

3. A thermally insulated, generally cylindrical tank structure comprising a cylindrical metal tank, a plurality of nonconducting supports of I shape in cross section positioned in spaced alignment around the tank with their base flanges lying in engagement with the surface of the tank to be insulated, connecting bands received through openings in said supports closely adjacent to the base flanges thereof, said bands encircling said tank, means securing bands in fixed position to hold said supports firmly against said surface, rectangular, preformed panels of semirigid, resilient thermal insulation material of substantially uniform thickness throughout fitted in aligned stacks on edge in abutting relationship and in radially sprung condition between each adjacent pair of said I shaped supports, covering said tank surface and said metal bands and confined against radially outward displacement by the exterior flanges of said supports.

4. A thermally insulated structure comprising a plurality of spaced nonconducting supports of I shape in cross section firmly secured in fixed alignment to the surface to be insulated, and rectangular preformed panels of semirigid, resilient thermal insulation material of substantially uniform thickness throughout and having a facing of sheet material secured thereto, said panels being fabricated to fit between the opposed flanges on adjacent pairs of said supports, said panels being positioned on edge in edge-to-edge abutting relationship between said adjacent pairs of said supports in a sprung condition, and substantially completely filling the intervening space therebetween, said insulation panels engaging the surface to be insulated along a line remote from the transverse edges of said panels and being under resilient compression under the flanges of said adjacent supports.

5. A thermally insulated, generally cylindrical tank structure comprising a plurality of spaced nonconducting supports of I shape in cross section firmly secured in fixed alignment to the cylindrical surface of the tank to be insulated and rectangular, preformed panels of semirigid, resilient thermal insulation material having a facing sheet secured thereto, said panels being fabricated to fit between the opposed flanges on adjacent pairs of said supports, said facing sheet having a flap projecting beyond an edge of each of said panels, said panels being stacked on edge in edge-to-edge abutting relationship between adjacent pairs of said supports in radially sprung condition and substantially completely filling the intervening space therebetween, said flap on each panel being disposed in overlapping relationship over the edge of the next adjacent panel.

6. A thermally insulated, generally cylindrical structure comprising a substantially cylindrical surface to be insulated, a plurality of spaced nonconducting supports of I shape in cross section firmly secured in fixed axial alignment to said surface to be insulated, and rectangular, preformed panels of semirigid, resilient, and normally flat thermal insulation material of substantially uniform thickness throughout and curved and in radially sprung condition and disposed on edge in edge-to-edge abutting relationship between said adjacent pairs of said supports and substantially completely filling the intervening space therebetween, the natural resiliency of the insulation causing the same to spring outwardly to engage the flanges of said supports.

7. A thermally insulated structure in accordance with claim 2 in which sealing means is provided at the joint between adjacent abutting panels.

8. A thermally insulated structure in accordance with claim 2 in which the facing includes integral shields which are arranged to receive and overlie the flanges of said supports.

9. A thermally insulated structure in accordance with claim 2 in which the insulation material is semi-rigid and resilient and in which the facing comprises a sheet of molded resin composition adhesively bonded to the surface of said insulation material.

References Cited in the file of this patent

UNITED STATES PATENTS

| | | |
|---|---|---|
| 1,675,354 | Kemper | July 3, 1928 |
| 2,181,074 | Scott | Nov. 21, 1939 |
| 2,238,022 | Johnson | Apr. 8, 1941 |
| 2,263,943 | Barnes | Nov. 25, 1941 |
| 2,295,103 | Friedly | Sept. 8, 1942 |
| 2,324,710 | Livar | July 20, 1943 |
| 2,528,771 | Mustee | Nov. 7, 1950 |
| 2,691,458 | Dinwiddie | Oct. 12, 1954 |
| 2,731,374 | De Reus | Jan. 17, 1956 |